United States Patent
Jung et al.

(10) Patent No.: US 8,204,686 B2
(45) Date of Patent: Jun. 19, 2012

(54) SCHEDULING METHOD USING PORTABLE TERMINAL AND NAVIGATION TERMINAL

(75) Inventors: Woo Jun Jung, Gumi-si (KR); Chang Taek Kang, Gumi-si (KR); Seung Mun Rho, Daegu Metropolitan (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1207 days.

(21) Appl. No.: 11/966,334

(22) Filed: Dec. 28, 2007

(65) Prior Publication Data

US 2008/0208449 A1      Aug. 28, 2008

(30) Foreign Application Priority Data

Feb. 28, 2007   (KR) .................. 10-2007-0020096

(51) Int. Cl.
  *G01C 21/00*   (2006.01)
  *G06F 3/01*    (2006.01)

(52) U.S. Cl. ... 701/516; 701/410; 701/431; 340/995.23; 340/539.11; 342/357.4

(58) Field of Classification Search .......... 340/995.23, 340/426.19
  See application file for complete search history.

(56) References Cited

U.S. PATENT DOCUMENTS

| | | | |
|---|---|---|---|
| 5,654,908 A * | 8/1997 | Yokoyama ............... 708/109 |
| 5,790,974 A * | 8/1998 | Tognazzini ............ 455/456.5 |
| 6,266,612 B1 * | 7/2001 | Dussell et al. ............ 701/207 |
| 6,285,950 B1 * | 9/2001 | Tanimoto ................. 701/201 |
| 6,360,101 B1 * | 3/2002 | Irvin ..................... 455/456.6 |
| 6,622,083 B1 * | 9/2003 | Knockeart et al. .......... 701/202 |
| 6,823,188 B1 * | 11/2004 | Stern ...................... 455/456.1 |
| 6,842,696 B2 * | 1/2005 | Silvester .................. 701/213 |
| 6,898,521 B2 * | 5/2005 | Yanai ...................... 701/210 |
| 6,944,539 B2 * | 9/2005 | Yamada et al. ............ 701/211 |
| 6,957,076 B2 * | 10/2005 | Hunzinger ............ 455/456.3 |
| 7,085,649 B2 * | 8/2006 | Baur et al. ................ 701/209 |
| 7,139,722 B2 * | 11/2006 | Perrella et al. ........... 705/7.19 |
| 7,239,961 B2 * | 7/2007 | Banet et al. .............. 701/208 |
| 7,376,511 B2 * | 5/2008 | Szabo et al. .............. 701/210 |
| 7,487,038 B2 * | 2/2009 | Kitagawa et al. ......... 701/202 |
| 7,499,715 B2 * | 3/2009 | Carro et al. ............ 455/456.3 |
| 7,583,972 B2 * | 9/2009 | Clipsham ................ 455/457 |
| 7,847,686 B1 * | 12/2010 | Atkins et al. ........... 340/539.13 |
| 7,941,753 B2 * | 5/2011 | Meisels et al. ............ 715/751 |
| 2006/0155465 A1 * | 7/2006 | Jung et al. ............... 701/209 |
| 2007/0135045 A1 * | 6/2007 | Son et al. ................ 455/41.2 |

FOREIGN PATENT DOCUMENTS

| | | |
|---|---|---|
| KR | 10-2006-0081193 | 7/2006 |
| KR | 10-2007-0008486 | 1/2007 |

OTHER PUBLICATIONS

Gehrmann,c. & Nyberg, K "Enhancements to Bluetooth Baseband Security", Proceedings of Nordsec 2001.*

* cited by examiner

*Primary Examiner* — Thomas Black
*Assistant Examiner* — Lin B Olsen
(74) *Attorney, Agent, or Firm* — H.C. Park & Associates, PLC

(57) ABSTRACT

A scheduling method using a portable terminal and a navigation terminal is disclosed, each of which has a short-range wireless communication module. The portable terminal creates schedule information including location data and alarm time data, and registers the schedule information as navigation schedule information. The portable terminal displays the schedule information when the alarm time occurs and transmits the location data to the navigation terminal through the short-range wireless communication module. The navigation terminal displays a route according to the received location data.

17 Claims, 9 Drawing Sheets

SCHEDULING METHOD USING PORTABLE TERMINAL AND NAVIGATION TERMINAL

CROSS REFERENCE TO RELATED APPLICATION

This application claims priority from and the benefit of Korean Patent Application No. 10-2007-0020096, filed on Feb. 28, 2007, which is hereby incorporated by reference for all purposes as if fully set forth herein.

BACKGROUND OF THE INVENTION

1. Field of the Invention

The present invention relates to a portable terminal, and more particularly to a scheduling method using a portable terminal and a navigation terminal.

2. Discussion of the Background

Recently, portable terminals are being used in a variety of fields because they can be conveniently carried, can store various application programs, and reproduce a variety of data. Also, various options can be added to the portable terminals. In particular, portable terminals may have a scheduling function so that users can manage their schedules. A user can set, change, and check their schedule using the scheduling functions of their portable terminal. The scheduling function may inform a user of a corresponding schedule through an alarm at a time set by the user, so that the user can check information of the corresponding schedule through the portable terminal's display screen.

But since the conventional scheduling function may only inform the user of scheduled information at a set time, the user only checks the schedule information through the portable terminal. That is, the conventional portable terminal may provide limited guidance in that the user can efficiently manage his/her schedules only according to his/her current location (or situation).

SUMMARY OF THE INVENTION

The present invention provides a scheduling method using a portable terminal and a navigation terminal, which can provide navigation services to a user according to schedule information stored in the portable terminal and transmitted to the navigation terminal. According to an exemplary embodiment of the invention, a portable terminal may communicate with a navigation terminal so that destination information of an event in the portable terminal's calendar may be sent from the portable terminal to the navigation terminal.

Additional features of the invention will be set forth in the description which follows, and in part will be apparent from the description, or may be learned by practice of the invention.

The present invention discloses a scheduling method using a portable terminal and a navigation terminal, each of which has a short-range wireless communication module. The method includes registering schedule information in the portable terminal as navigation schedule information that includes location data and alarm time data, displaying the schedule information on the portable terminal when the alarm time occurs and transmitting the location data to the navigation terminal through the short-range wireless communication modules, and displaying a route on the navigational terminal according to the received location data.

The present invention also discloses a scheduling method using a portable terminal and a navigation terminal, each of which has a short-range wireless communication module. The method includes storing schedule information in the portable terminal that includes location data and alarm time data, requesting the location and alarm time data from the portable terminal and receiving them through the short-range wireless communication modules, and comparing the received alarm time data with a current time in the navigation terminal, and displaying a route corresponding to the received location data when the received alarm time data is consistent with the current time.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
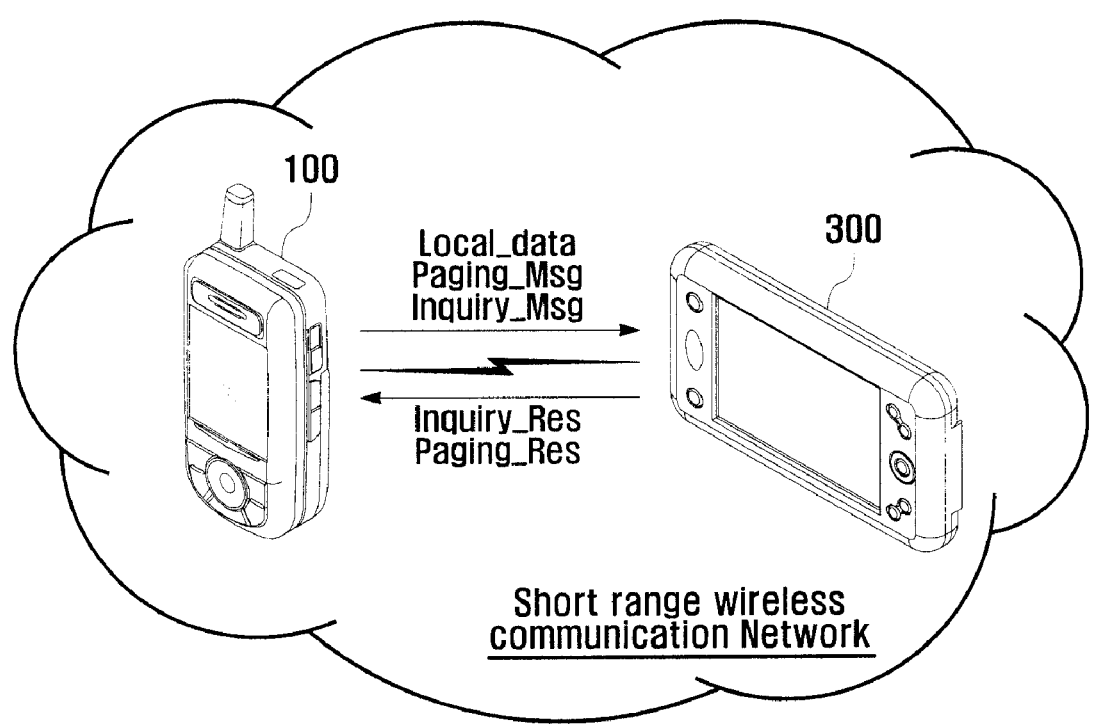
FIG. 1 shows a communication system between a portable terminal and a navigation terminal according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

A navigation terminal according to an exemplary embodiment of the present invention may include a global positioning system (GPS) receiver and a variety of sensors. The navigation terminal receives radio wave signals that correspond to latitude, longitude, and altitude, etc., from a plurality of satellites that are included in the GPS, and based on these received signals, calculates the current location of the terminal. The navigation terminal visually or audibly informs the user of the calculated current location of the terminal and map information, together. The navigation terminal may also display a variety of information for traveling, such as the direction in which the terminal is traveling, the distance to a desired destination, a route that the user set before traveling, and the optimal route to the destination, thereby allowing the user to easily obtain corresponding information for his/her travels.

In exemplary embodiments of the present invention, schedule information may include information input through a schedule menu of a portable terminal, such as date, time, content, location data including place and address, alarm time, and whether navigation service is set. Location information is map information that is displayed on the navigation terminal and that corresponds to the actual location of location data. Navigation service refers to a service that includes determining a current location of a navigation terminal, calculating a route from the current location to a location corresponding to location data, and displaying the calculated route. Navigation schedule information refers to information that may be created when the navigation service is set in a schedule menu of a portable terminal, in which the navigation service is provided at the alarm time saved through the schedule menu.

In addition, although exemplary embodiments of the present invention describe a short-range wireless communication module based on Bluetooth® communication, other short range wireless communication systems may be used. For example, the short-range wireless communication module of the present invention can be applicable to Zigbee®, RuBee® (IEEE1902.1), ultra wide band (UWB), and infrared data association (IrDA®) communications, as well as Bluetooth® communication.

A portable terminal according to exemplary embodiments of the present invention refers to a terminal that includes a short-range wireless communication module and is configured such that it can perform a scheduling function in association with a navigation terminal. All information communication devices, multimedia devices, and their applications, such as, a digital broadcasting terminal, personal digital assistant (PDA) terminal, smart phone, international mobile telecommunication 2000 (IMT-2000) terminal, code division multiple access (CDMA) terminal, wideband code division multiple access (WCDMA) terminal, global system for mobile communication (GSM) terminal, universal mobile telecommunication service (UMTS) terminal, etc., may be used as the portable terminal according to exemplary embodiments of the present invention.

Figure 2:
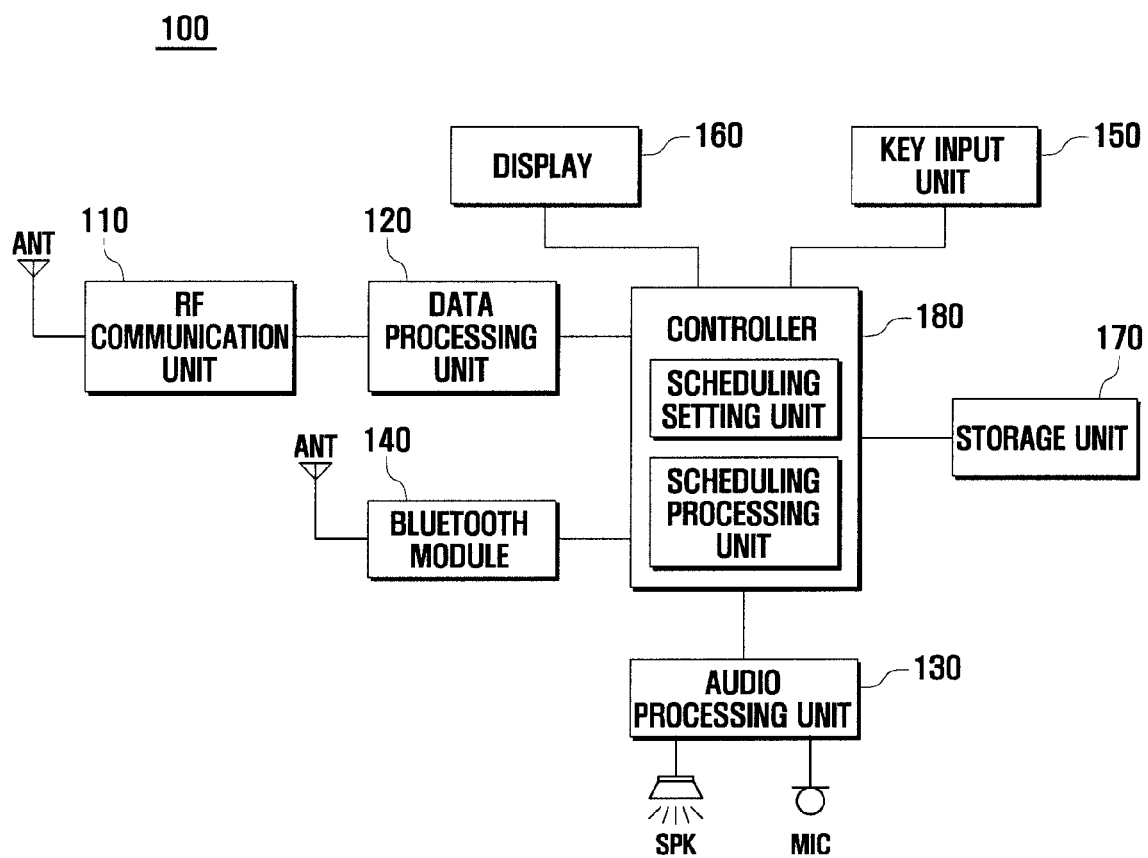
FIG. 2 is a schematic block diagram showing a portable terminal according to an exemplary embodiment of the present invention.

FIG. 1 shows a communication system between a portable terminal and a navigation terminal according to an exemplary embodiment of the present invention. FIG. 2 is a schematic block diagram showing a portable terminal according to an exemplary embodiment of the present invention.

Referring to FIG. 1 and FIG. 2, the portable terminal 100 is configured to include a radio frequency (RF) communication unit 110, data processing unit 120, audio processing unit 130, Bluetooth® module 140, key input unit 150, display 160, storage unit 170, and controller 180.

The radio frequency (RF) communication unit 110 establishes a communication channel with a base station, so that the portable terminal can perform data and voice communications with other portable terminals therethrough. That is, through the communication channel, the RF communication unit 110 transmits user data to other portable terminals and performs transmission/reception of contents associated with external web servers and control signals related to the contents. The RF communication unit 110 is configured to include an RF transmitter for up-converting the frequency of transmitted signals and amplifying the transmitted signals, and an RF receiver for low-noise amplifying received RF signals and down-converting the frequency of the received RF signals.

The data processing unit 120 processes voice data transmitted from the audio processing unit 130, numeric/character data that a user inputs through the key input unit 150, and data transmitted from the RF communication unit 110. The data processing unit 120 includes a transmitter, which encodes/modulates a signal to be transmitted through the RF communication unit 110, and a receiver that demodulates/decodes received signals. That is, the data processing unit 120 includes a data codec to process packet data and an audio codec to process audio signals, such as a voice signal.

The audio processing unit 130 reproduces audio signals output from the data processing unit 120 and transmits audio signals, such as a voice signal, input through a microphone MIC to the data processing unit 120. That is, the audio processing unit 130 converts voice/audio data into audible sound signals output through a speaker SPK, according to the control of the controller 180. The audio processing unit 130 also creates data from audio signals, such as voice signals, etc., received by the microphone MIC and then outputs the data.

The Bluetooth® module 140 may further include a Bluetooth® antenna ANT. The Bluetooth® module 140 forms a communication link with a device that also has a Bluetooth® module, for example, a navigation terminal 300, through the Bluetooth® antenna ANT, and then transmits/receives data through the communication link. The Bluetooth® module 140 also stores a host stack for Bluetooth® communication, and Bluetooth® profiles and application programs, which can be selected according to functions or conditions of the navigation terminal 300 as a communication target. Here, the Bluetooth® profiles may include object push profile (OPP), etc., which may be necessary to perform object replacement or file transmission. In particular, the Bluetooth® module 140 according to an exemplary embodiment of the present invention forms a communication link with a Bluetooth® module 310 of the navigation terminal 300 and transmits location data from portable terminal 100 to the navigation terminal 300.

The key input unit 150 inputs figure or character information. The key input unit 150 is configured to include a plurality of input keys and function keys to set a variety of functions. The function keys include direction keys, side keys, and shortcut keys, etc., which are set to perform specific functions. Also, the key input unit 150 transmits input key signals, related to user settings and function controls of a portable terminal, to the controller 180. In particular, the key input unit 150 creates key signals corresponding to a schedule that a user has input and transmits them to the controller 180.

The display 160 displays user data input by a user, function setting information, or a variety of information intended to be provided to the user, as well as various menus of the portable terminal 100. The display 160 may be a liquid crystal display (LCD). If the LCD is a touch screen LCD, the display 160 may serve as an input means. When date and time stored in the schedule come due, the display 160 activates the schedule according to whether the alarm is set.

The storage unit 170 stores downloaded contents, user data, and schedule information that are created by the user, as well as application programs that perform functions of the portable terminal 100. The storage unit 170 includes at least one or more buffers that temporarily store user data generated while a certain application program, such as a program for processing text messages, is executed. The storage unit 170 may be configured to include a program area and a data area.

The program area stores an operating system (OS) for booting the portable terminal 100, an application program for a scheduler, etc., and other application programs that are used for other functions of the portable terminal 100, such as a camera function, audio reproduction function, and image or moving image reproduction function, etc. When the user requests the respective listed functions in the portable terminal 100, the controller 180 activates the corresponding application programs in response to the user's request to provide the corresponding functions to the user.

The data area refers to an area for storing data created while using the portable terminal 100. Specifically, the data area stores contents downloaded through a content server, etc., and stores user data, which is related to the above-described various functions, for example, images or moving images, phone book data, audio data, and text messages, etc. The data area also stores setting information corresponding to the user data. In particular, the data area additionally stores a schedule input by the user and location data (Local_Data) extracted from the schedule.

The controller 180 controls operations of the portable terminal 100 and signal flows between components of the portable terminal 100. The controller 180 may also include functions of the data processing unit 120.

In particular, the controller 180 controls functions related to scheduler and navigation services. To this end, the controller 180 is configured to include a schedule setting unit and a schedule processing unit.

The schedule setting unit stores a schedule inputted by a user, setting date and time to activate the schedule. When the date and time come due, the schedule setting unit displays the stored schedule and alarms the user though a preset alarm method. The schedule setting unit also stores whether the navigation service is set and activates the schedule processing unit according to whether the navigation service is set. Here, the schedule setting unit allows a pop-up window on the display 160 to display whether the navigation service is set. That is, when the user sets the schedule alarm and navigation service, and the date and time, which are set so that the alarm and navigation service are activated, have come due, the schedule setting unit alarms the user according to a preset alarm method and activates the schedule processing unit.

The schedule processing unit transmits location data (Local_Data) stored in the storage unit 170 to the navigation terminal 300 when the navigation service is activated. Specifically, the schedule processing unit activates a short-range wireless communication module, such as the Bluetooth® module 140, and transmits an inquiry message (Inquiry_Msg). The inquiry message (Inquiry_Msg) may be transmitted to all devices located within a Bluetooth® network area that include a Bluetooth® module. The schedule processing unit then transmits a paging message (Paging_Msg) to a device, i.e., the navigation terminal 300, that transmitted an inquiry response message (Inquiry_Res) thereto in response to the inquiry message (Inquiry_Msg). The schedule processing forms a link with the navigation terminal 300 that transmitted a paging response message (Paging_Res) thereto in response to the paging message (Paging_Msg), thereby pairing the portable terminal 100 and the navigation terminal 300. That is, the portable terminal 100 forms a communication link with the navigation terminal 300, which transmitted the paging response message (Paging_Res), and the portable terminal 100 transmits location data (Local_Data) stored in the storage unit 170 to the navigation terminal 300 through the communication link.

Figure 3:
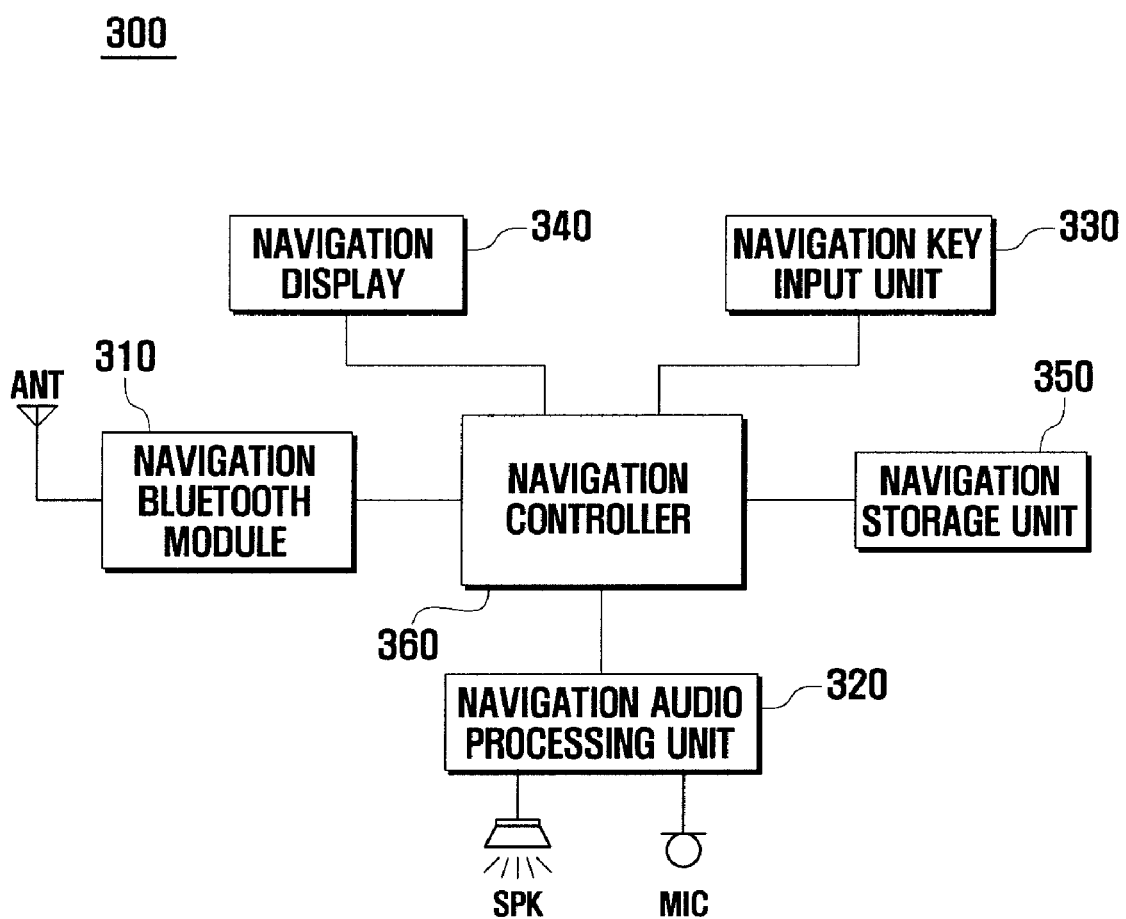
FIG. 3 is a schematic block diagram showing a navigation terminal according to an exemplary embodiment of the present invention.

FIG. 3 is a schematic block diagram illustrating the navigation terminal 300 according to an exemplary embodiment of the present invention.

Referring to FIG. 1 and FIG. 3, the navigation terminal 300 is configured to include a navigation Bluetooth® module 310, navigation audio processing unit 320, navigation key input unit 330, navigation display 340, navigation storage unit 350, and navigation controller 360.

The navigation Bluetooth® module 310 may further include a Bluetooth® antenna ANT. The navigation Bluetooth® module 310 forms a communication link with the Bluetooth® module 140 of the portable terminal 100 through the Bluetooth® antenna ANT, and then transmits/receives data through the communication link. Also, the navigation Bluetooth® module 310 stores a host stack for Bluetooth® communication and Bluetooth® profiles and application programs, which can be selected according to functions or conditions of the portable terminal 100 as a communication target. Here, the Bluetooth® profiles may include object push profile (OPP), etc., which may be necessary to perform object replacement or file transmission.

The navigation audio processing unit 320 reproduces audio signals output from the navigation controller 360 or transmits audio signals, such as a voice signal, input through a microphone MIC to the navigation controller 360. That is, the navigation audio processing unit 320 converts voice/audio data into sound signals and outputs them through a speaker SPK, according to the control of the controller 180. The navigation audio processing unit 320 also creates data from audio signals, such as voice signals, etc., received by the microphone MIC and then outputs the data. In particular, the navigation audio processing unit 320 may analyze a voice signal that a user input through the microphone MIC in a voice recognition menu and transmit the result to the navigation controller 360.

The navigation key input unit 330 inputs figure or character information. The navigation key input unit 330 is configured to include a plurality of input keys and function keys to set a variety of functions. The function keys include direction keys, side keys, and shortcut keys, etc., which are set to perform specific functions. Also, the navigation key input unit 330 transmits input key signals, related to user settings and function control of the navigation terminal 300, to the navigation controller 360. In particular, the navigation key input unit 330 creates key signals corresponding to a place and location that the user selects and transmits them to the navigation controller 360.

The navigation display 340 displays user data input by a user, function setting information, or various maps and routes provided to the user, as well as various menus of the navigation terminal 300. The navigation display 340 may be an LCD. If it is a touch screen LCD, the navigation display 340 may be used as an input means. In particular, the navigation display 340 may be a touch screen display that displays location information corresponding to location data (Local_Data) transmitted from the portable terminal 100. Also, when plural location information are displayed in a list and the user selects location information from the location information list, the navigation display 340 displays a map and route of the selected location information, and may also display turn by turn (TBT) information.

The navigation storage unit 350 stores application programs for functions, such as a sound reproduction function, image or moving reproduction functions, etc., as well as application programs for performing navigation functions. When the user requests the respective listed functions in the navigation terminal 300, the navigation controller 360 activates the corresponding application programs to provide the corresponding functions to the user. Also, the navigation storage unit 350 refers to a storing area for storing data created while using the navigation terminal 300. Specifically, the navigation storage unit 350 can store map and route data for providing navigation services, and user data related to the variety of other functions, for example, image or moving image data, and audio data, etc., as described above. In particular, the navigation storage unit 350 can store location data (Local_Data) transmitted from the portable terminal 100 and maps for searching for location information corresponding to the location data (Local_Data), road map data for calculating the optimal route, and traffic information, etc.

The navigation controller 360 controls the operations of the navigation terminal 300 and signal flows between components of the navigation terminal 300. In particular, when receiving an inquiry message (Inquiry_Msg) from a device including a Bluetooth® module, i.e., the portable terminal 100, the navigation controller 360 transmits an inquiry response message (Inquiry_Res) to the portable terminal 100 in response to the inquiry message (Inquiry_Msg). Also, when receiving a paging message (Paging_Msg) from the portable terminal 100, the navigation controller 360 transmits a paging response message (Paging_Res) to the portable terminal 100 in response to the paging message (Paging_Msg), and forms a communication link with the portable terminal 100, thereby pairing the navigation terminal 300 and the portable terminal 100. The navigation controller 360 receives the location data (Local_Data) from the portable terminal 100 through the communication link, searches for location information corresponding to the location data (Local_Data), and enables the location information to be displayed. Here, when there is plural location information, it can be displayed in a list. When the user selects one piece of location information from the list, the navigation controller 360 displays a map and route including the selected location information. For example, the user can select location information through a voice recognition function. In that case, the navigation controller 360 displays a map and route of location information corresponding to the voice signal received in the navigation audio processing unit 320.

The portable terminal 100 and the navigation terminal 300 may have various configurations besides those shown in FIG. 1, FIG. 2, and FIG. 3. For example, the portable terminal 100 and the navigation terminal 300 may be modified to further include a camera and/or digital broadcasting module, and a portable Internet module, etc.

A scheduling method using the portable terminal 100 and the navigation terminal 300 according to exemplary embodiments of the present invention is described below with reference to FIG. 4, FIG. 5, and FIG. 6.

Figure 4:
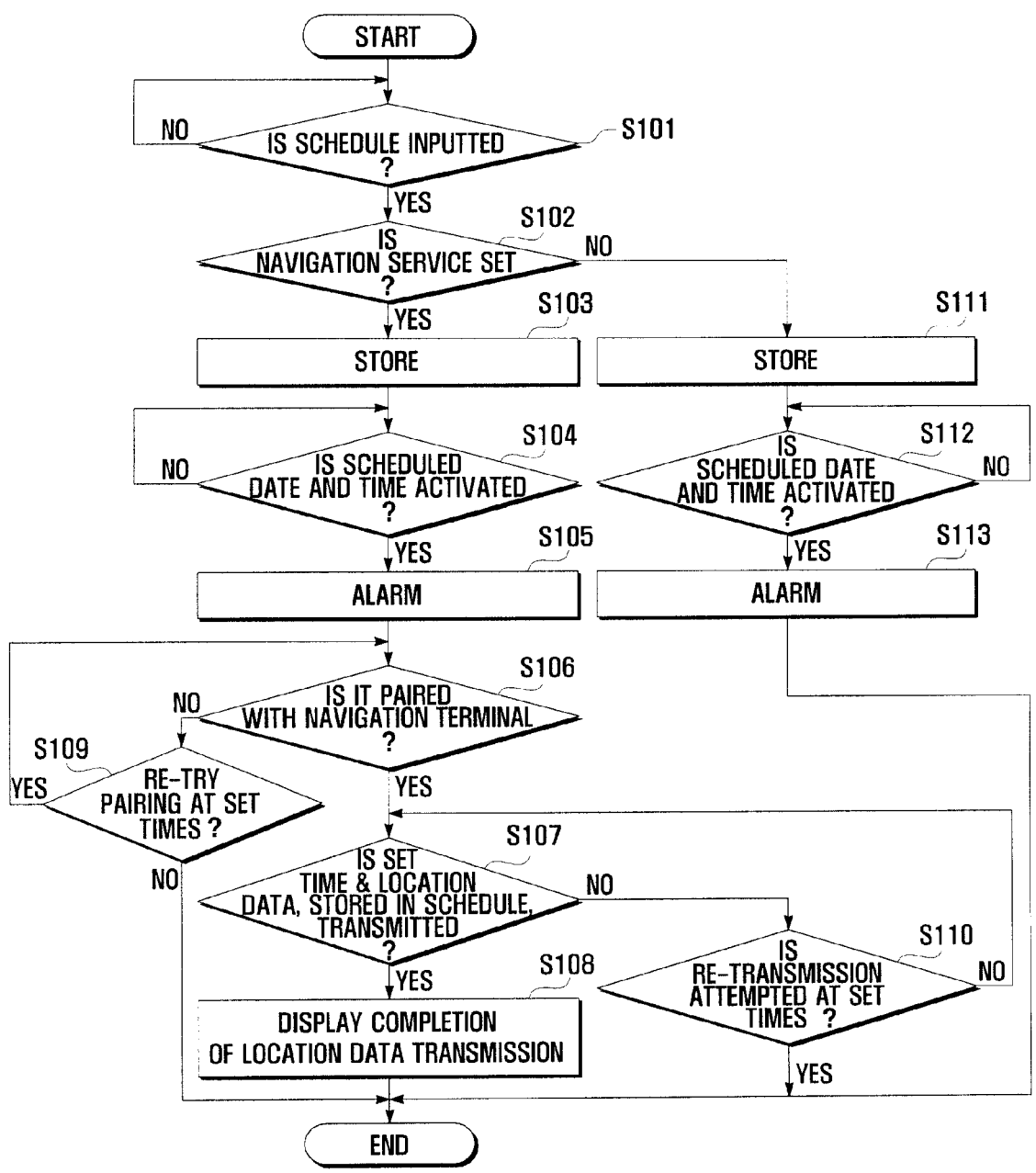
FIG. 4 is a flow chart showing a scheduling method of a portable terminal according to an exemplary embodiment of the present invention.

FIG. 4 is a flow chart showing a scheduling method of a portable terminal 100 according to an exemplary embodiment of the present invention.

Figure 7:
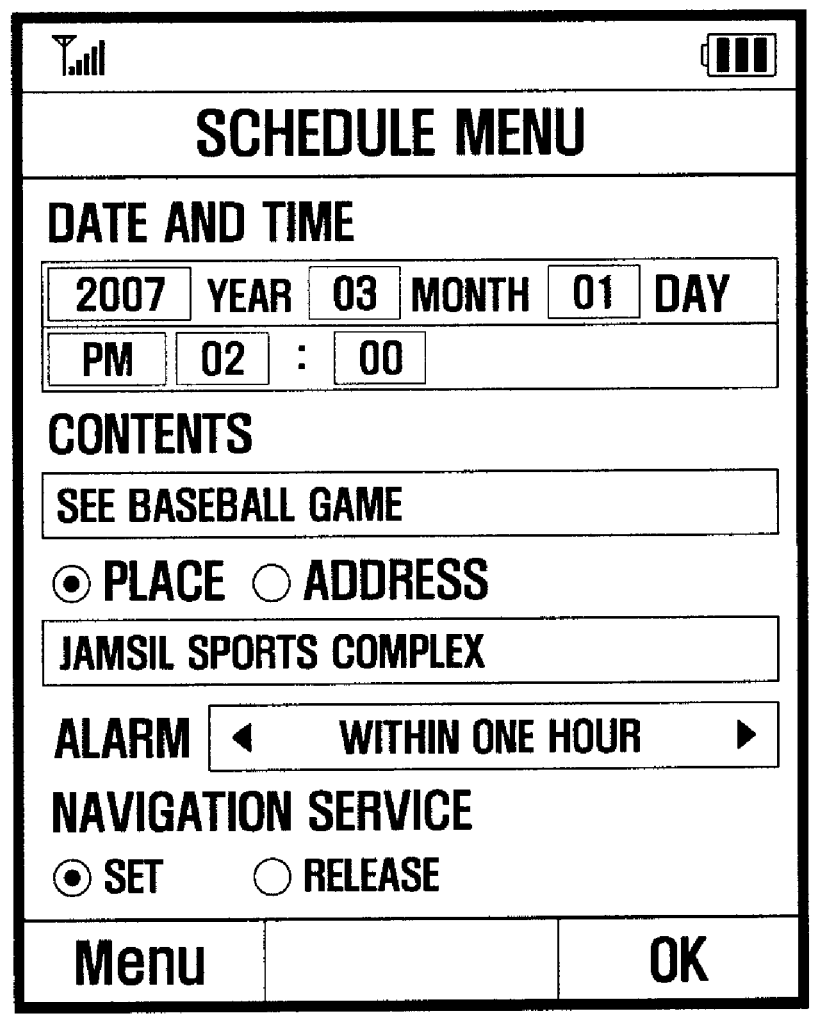
FIG. 7 shows a screen of a portable terminal employing a scheduling method according to an exemplary embodiment of the present invention.

Referring to FIG. 4, when the controller 180 of the portable terminal 100 detects input of a schedule (S101), it checks whether a navigation service is set (S102). Specifically, as FIG. 7 shows, a user may set schedule information through the schedule menu in such a way that: date and time is set as Mar. 1, 2007, 2:00 p.m.; contents are input to "see baseball game"; location information is input as a place, which is "Jamsil Sports Complex"; and alarm is set for "within one hour". The user also sets whether to receive the navigation service using the navigation terminal 300 when the alarm goes off.

The controller 180 stores the schedule information input by the user (S103). When the date and time have come due so that the schedule can be activated (S104), the controller 180 alarms the user according to a preset alarm method (S105). The alarm method may be to display the schedule information on the display 160 and to make a sound, a vibration, or turn a lamp on, etc. In addition, when the user sets a function that performs a re-alarm after a certain time elapses and requests to receive the navigation service at the re-alarming time, the controller 180 performs the re-alarm and initiates navigation service to the user after the certain set time has elapsed. Here, the re-alarm may be performed at intervals of 5 minutes, 30 minutes, or 1 hour, and stopped by the user.

The controller 180 activates the Bluetooth® module 140 and tries pairing with a device including a Bluetooth® module, i.e., the navigation terminal 300 (S106), that can provide navigation services in a Bluetooth® network area. Specifically, the controller 180 activates the Bluetooth® module 140 to broadcast an inquiry message (Inquiry_Msg) to the navigation terminal 300 and receives an inquiry response message (Inquiry_Res) from the navigation terminal 300 after receiving the inquiry message (Inquiry_Msg). The controller 180 transmits a paging message (Paging_Msg) to the navigation terminal 300 having transmitted the inquiry message (Inquiry_Res) to receive a paging response message (Paging_Res), thereby forming a communication link with the navigation terminal 300 and pairing the portable terminal 100 and the navigation terminal 300. When the portable terminal 100 is paired with the navigation terminal 300 in S106, the controller 180 checks whether location data (Local_Data) is transmitted to the navigation terminal 300 within a preset time (S107).

When the location data (Local_Data) is transmitted to the navigation terminal 300 within a preset time in S107, the controller 180 directs the display 160 to display that the location data (Local_Data) has been transmitted to the navigation terminal 300 (S108).

But when the portable terminal 100 is not paired with the navigation terminal 300 in S106, the controller 180 may re-try pairing at preset times (S109). Here, when the controller 180 is not set to re-try pairing at the preset times, or the pairing fails, the navigation service is terminated.

Also, when the location data (Local_Data) is not transmitted within the preset time in S107, the controller 180 re-transmits the location data at the preset times (S110). When the location data (Local_Data) is not transmitted within a preset time corresponding to when the retransmission is tried at the preset times, the controller 180 releases the communication link with the navigation terminal 300.

When the navigation service is not set in S102, the controller stores the input schedule information (S111). When the date and time for activating the schedule has come (S112), the controller 180 alarms the user according to a preset alarm method (S113).

Figure 5:
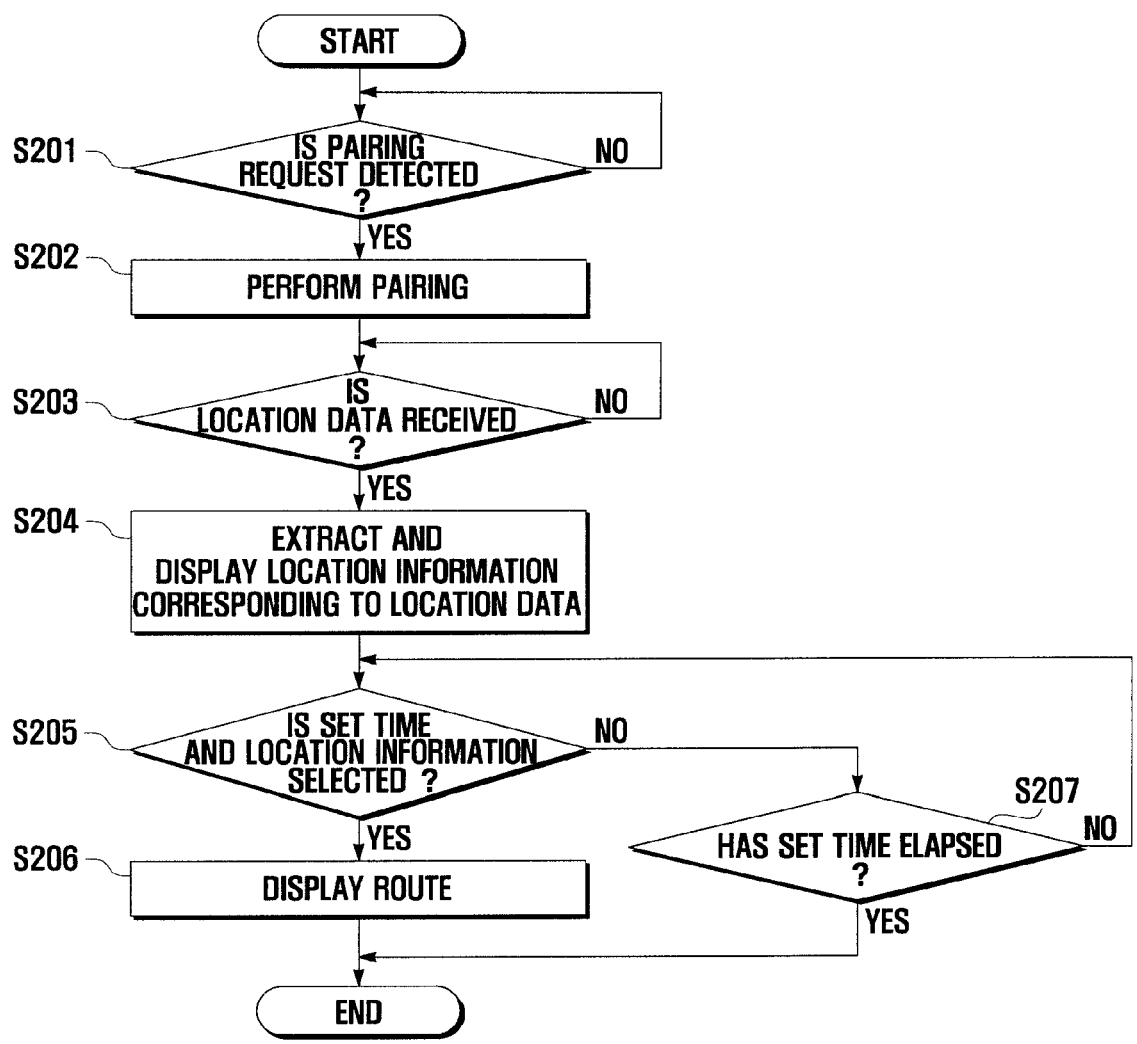
FIG. 5 is a flow chart showing a method for providing a route in a navigation terminal according to an exemplary embodiment of the present invention.

FIG. 5 is a flow chart describing a method for providing a route in a navigation terminal 300 according to an exemplary embodiment of the present invention.

Referring to FIG. 5, when detecting a pairing request from the portable terminal 100 including the Bluetooth® module 140 (S201), the navigation terminal 300 performs pairing with the portable terminal 100 having requested the pairing (S202). Specifically, when receiving an inquiry message (Inquiry_Msg) from the portable terminal 100 in a Bluetooth® network area, the navigation controller 360 transmits an inquiry response message (Inquiry_Res) to the portable terminal 100. Also, when receiving a paging message (Paging_Msg) from the portable terminal 100, the navigation controller 360 transmits a paging response message (Paging_Res) to the portable terminal 100 and forms a communication link, thereby pairing the navigation terminal 300 and the portable terminal 100.

After receiving the location data (Local_Data) from the portable terminal 100 through the communication link (S203), the navigation controller 360 searches for location information corresponding to the location data (Local_Data) and then enables it to be displayed (S204). That is, the navigation controller 360 checks whether the received location data (Local_Data) is a place or address and then extracts location information corresponding to the checked result. In addition, when plural location information corresponds to the location data (Local_Data), the controller 180 displays them in a list. For example, when the portable terminal 100 stores a schedule menu as follows: to see a baseball game on March 1, 2:00 p.m. at Jamsil Sports Complex, the navigation controller 360 receives location data input to the Place item of the schedule menu to extract location information corresponding to Jamsil Sports Complex. Also, when receiving location data of an address as location data (Local_Data), the controller 180 searches for the address within a certain range of area where the user is currently located and then displays the results as map data. Here, the certain range of area may be directly set by the user, or by navigation terminal manufacturers when the navigation terminals are manufactured. Here, the area may be set to range from a few meters to several tens of kilometers in radius from a point where the user is located. In addition, when a plurality of addresses exists within the range of area where the user is located, the controller 180 displays them in a list.

When detecting that location information is selected within a preset time (S205), the navigation controller 360 displays the selected location information as map data and a route calculated from the current place to the selected location. Also, the navigation controller 360 may display the route in turn-by-turn (TBT) mode, so that the user can easily use navigation services. Here, the user can select the location information through a voice recognition function. That is, when the user inputs his/her voice by number or name corresponding to his/her desired location information in a menu screen where location information is displayed, the navigation controller 360 activates the location information corresponding to the input voice and then enables it to be displayed.

Figure 6:
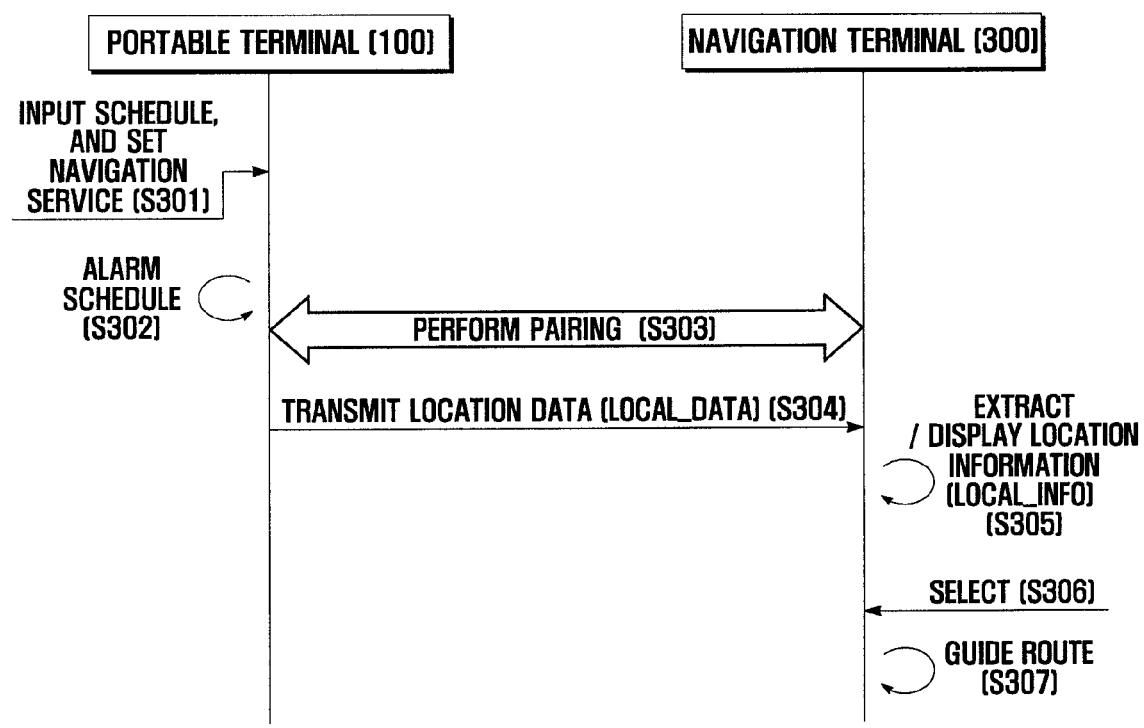
FIG. 6 is a signal sequence diagram showing a procedure of processing signals between a portable terminal and a navigation terminal according to an exemplary embodiment of the present invention.

FIG. 6 is a signal sequence diagram describing a procedure of processing signals between a portable terminal 100 and a navigation terminal 300 according to an exemplary embodiment of the present invention.

Referring to FIG. 6, the portable terminal 100 allows input of schedule information and setting of navigation services (S301). When the date and time set in the schedule have come, the portable terminal alarms a user through a preset alarming method (S302). The portable terminal 100 is paired with the navigation terminal 300 in a Bluetooth® network (S303) range, and then transmits location data (Local_Data) stored in the schedule to the navigation terminal 300 (S304).

The navigation terminal 300 extracts location information corresponding to the received location data (Local_Data) and displays it (S305). Here, the location data (Local_Data) refers to a place or an address that the user input in the schedule menu (FIG. 7). The location information refers to actual map data corresponding to the place or the address input by the user. When detecting that the user selected the location information (S306), the navigation terminal 300 calculates a route from the current location to the selected location information and displays the route together with TBT information (S307). When the user sets a voice recognition function to select the location information, the navigation terminal 300 analyzes user's voice signals input through a microphone and performs corresponding functions based on the analysis.

Figure 8:
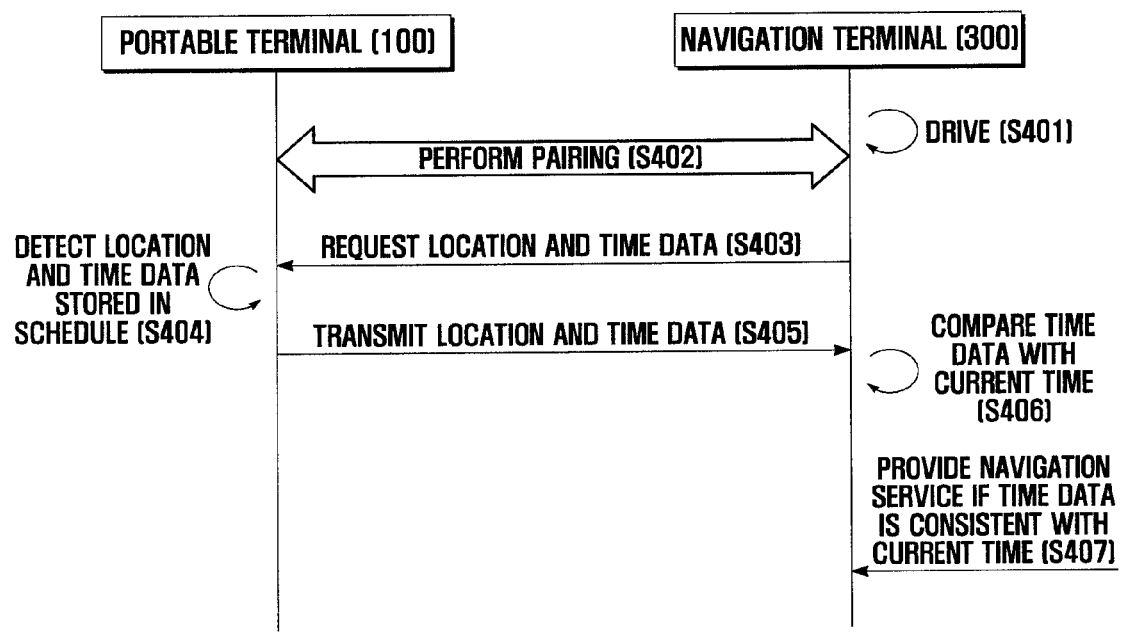
FIG. 8 is a signal sequence diagram showing a scheduling method using a portable terminal and a navigation terminal according to an exemplary embodiment of the present invention.

FIG. 8 shows an alternative scheduling method for the portable terminal 100 and the navigation terminal 300. Referring to FIG. 8, when the navigation terminal 300 is operated (S401), it is paired with the portable terminal 100 through a Bluetooth® module (S402), and then it requests location and time data from the portable terminal 100 (S403). Here, the time data refers to an alarm time (i.e. date and time) stored in a schedule menu of the portable terminal The portable terminal 100 searches for location and time data in the schedule menu (S404) and then transmits it to the navigation terminal 300 (S405).

The navigation terminal 300 compares the received location and time data with the current time (S406). At this time, the received time data is a predetermined time, which is scheduled by a user of a portable terminal in advance. When the received location and time data is equal to the current time in S406, the navigation terminal 300 provides navigation services (S407). That is, when the location and time data from the portable terminal 100 is equal to the current time, the navigation terminal 300 searches for location information corresponding to the received location data (Local_Data) and displays it. When the user selects one piece of the displayed location information, the navigation terminal 300 provides a navigation service corresponding to the selected location information, for example, a route. On the contrary, when the received time data is not equal to the current time, the navigation terminal 300 does not provide a navigation service corresponding to the received location data (Local_Data) until the time corresponding to the received time data has come due.

Figure 9:
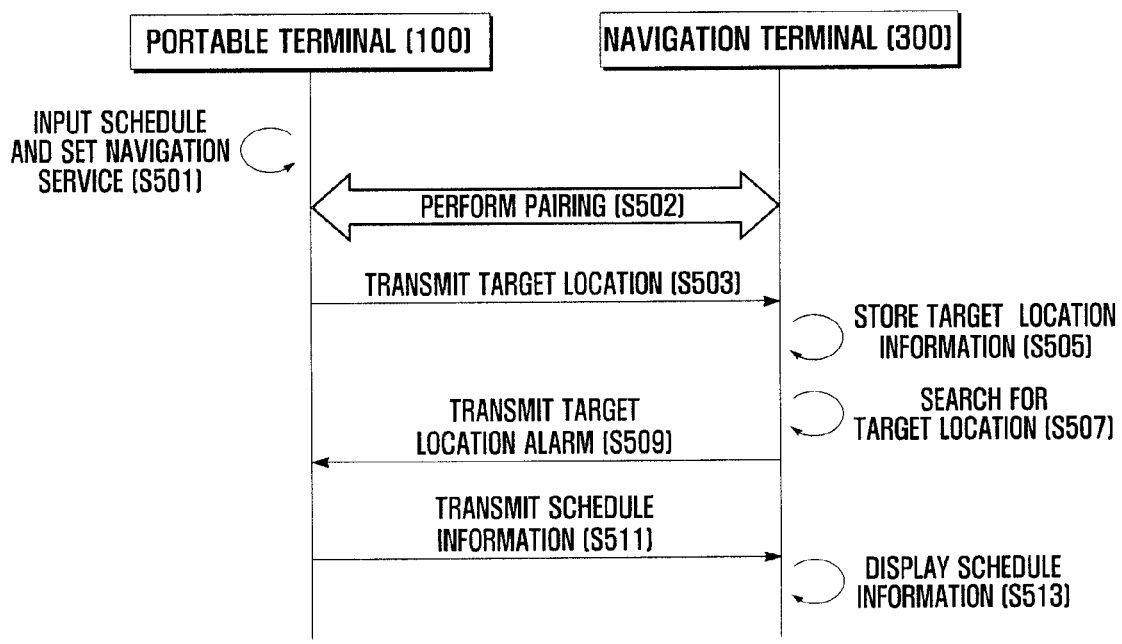
FIG. 9 is a signal sequence diagram showing a scheduling method using a portable terminal and a navigation terminal according to another exemplary embodiment of the present invention.

FIG. 9 is a signal sequence diagram showing a scheduling method using a portable terminal and a navigation terminal according to another exemplary embodiment of.

Referring to FIG. 9 together with FIG. 1 to FIG. 3, the portable terminal 100 first sets the input schedule and navigation service (S501). To this end, the portable terminal 100 inputs the schedule information input by the user and target location information for displaying the schedule information. The schedule information is referred to as information alarms the user when the target location information is displayed so that the user can perform corresponding job. And, the portable terminal 100 pairs with the navigation terminal 300 to achieve a short-range wireless communication channel (S502). After that, the portable terminal 100 transmits the target location information to the navigation terminal 300 (S503). The target location information is information input at step S501 and represents location information for displaying schedule information. After receiving the target location information, if the portable terminal 100 does not receive any additional operation command at step S503 or inputs a request for releasing a short-range wireless communication channel user, the portable terminal 100 may disconnect the communication channel with the navigation terminal 300. After that, the navigation terminal 300 stores the received target location information in the navigation storage unit 350 (S505). After acquiring location information according to movement, the navigation terminal 300 compares the acquired location information with the target location information and searches for a target location (S507). That is, the navigation terminal 300 determines whether the current location is identical to the location included in the target location information.

If the navigation terminal 300 has searched for the location identical to the target location at step S507, it alarms the portable terminal 100 that the current location is consistent with the target location (S509). If the short-range wireless communication channel is unconnected to the portable terminal 100 when notifying the portable terminal 100 of the target location, the navigation terminal 300 scans the portable terminal 100 and then pairs with the portable terminal 100, so that the short-range wireless communication channel can be newly established. After receiving the alarm for the target location from the navigation terminal 300, the portable terminal 100 transmits schedule information to the navigation terminal 300 (S511). The navigation terminal 300 displays the received schedule information on the navigation display 340 (S513). If the map is displaying on the navigation display 340, the navigation terminal 300 overlaps and displays the schedule information on the map.

As such, another exemplary embodiment of the scheduling method can display schedule information if a area where the navigation terminal 300 is located is a target location where the schedule information is displayed, thereby notifying the user of schedule alarms based on locations. Although another embodiment of the scheduling method of the present invention is implemented in such a way that the portable terminal 100 stores the schedule information and transmits it to the navigation terminal 300 when a target location alarm occurs in the navigation terminal 300, it should be understood that the present invention is not limited embodiment instead modified in such a manner that: the target location information is transmitted along with the schedule information at step S503 so that the navigation terminal 300 can store the target location information and the schedule information in the navigation storage unit 350 and thus the schedule information can be immediately displayed on the navigation display 340 from the storage unit 350 if the navigation terminal 300 searches for the target location.

As described in the foregoing, the scheduling method according to exemplary embodiments of the present invention transmits schedule information stored in a portable terminal to a navigation terminal, thereby providing navigation services according to the schedule information to a user.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A scheduling method using a portable terminal and a navigation terminal each of which has a short-range wireless communication module, comprising:
    registering schedule information in the portable terminal as navigation schedule information, the schedule information comprising location data and alarm time data;
    displaying the schedule information on the portable terminal when the alarm time occurs and transmitting the location data to the navigation terminal through the short-range wireless communication modules; and
    displaying a route on the navigational terminal according to the received location data.

2. The method of claim 1, wherein displaying the route comprises:
    searching for at least one location information according to the location data;
    extracting a map;
    calculating a route from a current location of the portable terminal to the location data; and
    displaying the map and the route.

3. The method of claim 2, wherein:
    the location data comprises destination information; and
    a starting place is a current location of the portable terminal.

4. The method of claim 3, wherein displaying the route further comprises displaying plural location information in a list, wherein the displayed map and route correspond to location information selected from the plural location information in the list.

5. The method of claim 4, wherein the location information is selected from the list through a voice recognition function.

6. The method of claim 5, wherein the schedule information is registered as the navigation schedule information when navigation services are activated.

7. The method of claim 6, wherein transmitting the location data comprises:
    forming a communication link between the portable terminal and the navigation terminal through the short-range wireless communication modules; and
    transmitting the location data to the navigation terminal through the communication link.

8. The method of claim 7, further comprising re-transmitting the location data when the location data is not received at the navigation terminal within a preset time.

9. A scheduling method using a portable terminal and a navigation terminal each of which has a short-range wireless communication module, comprising:
    storing schedule information in the portable terminal, the schedule information including location data and alarm time data;
    requesting the location data and the alarm time data from the portable terminal at the navigation terminal;
    receiving the location data and the alarm time data at the navigation terminal through the short-range wireless communication modules; and
    comparing the received alarm time data of the schedule information with a current time in the navigation terminal, and displaying a route corresponding to the received location data when the received alarm time data is equal to the current time.

10. The method of claim 9, wherein displaying the route comprises:
    displaying plural location information in a list; and
    displaying a map and a route from a current location of the portable terminal to location information selected from the plural location information in the list.

11. The method of claim 10, wherein:
    the location data comprises destination information; and
    a starting place is a current location of the portable terminal.

12. The method of claim 11, wherein the location information is selected from the list through a voice recognition function.

13. A scheduling method using a portable terminal and a navigation terminal each of which has a short-range wireless communication module, comprising:
    receiving target location information and schedule information to be displayed at a target location designated by the target location information at the portable terminal;

transmitting the target location information from the portable terminal to the navigation terminal;
storing the target location information in the navigation terminal;
comparing a current location with the target location at the navigation terminal;
alarming from the navigation terminal to the portable terminal, in response to the current location being consistent with the target location;
transmitting the schedule information from the portable terminal to the navigation terminal; and
displaying the schedule information on the navigation terminal.

14. The method of claim 13, wherein transmitting the target location information from the portable terminal to the navigation terminal comprises:
pairing the portable terminal and the navigation terminal;
establishing a short-range wireless communication channel between the portable terminal and the navigation terminal; and
transmitting the target location information through the short-range wireless communication channel from the portable terminal to the navigation terminal.

15. The method of claim 13, wherein alarming from the navigation terminal to the portable terminal comprises:
pairing the portable terminal and the navigation terminal;
establishing a short-range wireless communication channel between the portable terminal and the navigation terminal; and
transmitting the target location alarm through the short-range wireless communication channel from the navigation terminal to the portable terminal.

16. A scheduling method using a portable terminal and a navigation terminal each of which has a short-range wireless communication module, comprising:
inputting target location information and schedule information to be displayed at a target location designated by the target location information at the portable terminal;
transmitting the target location information and the schedule information from the portable terminal to the navigation terminal;
storing the target location information and the schedule information in the navigation terminal;
comparing a current location of the portable terminal with the target location at the navigation terminal;
alarming the portable terminal and displaying the schedule information on the navigation terminal, in response to the current location being consistent with the target location.

17. The method of claim 16, wherein transmitting the target location information from the portable terminal to the navigation terminal comprises:
pairing the portable terminal and the navigation terminal;
establishing a short-range wireless communication channel between the portable terminal and the navigation terminal; and
transmitting the target location information through the short-range wireless communication channel from the portable terminal to the navigation terminal.

* * * * *